A. HASELTINE, Jr.
Improvement in Sawing-Machines.
No. 129,952.  Patented July 30, 1872.
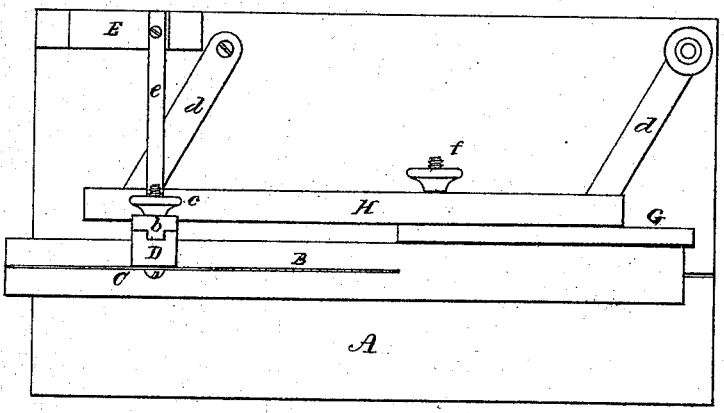
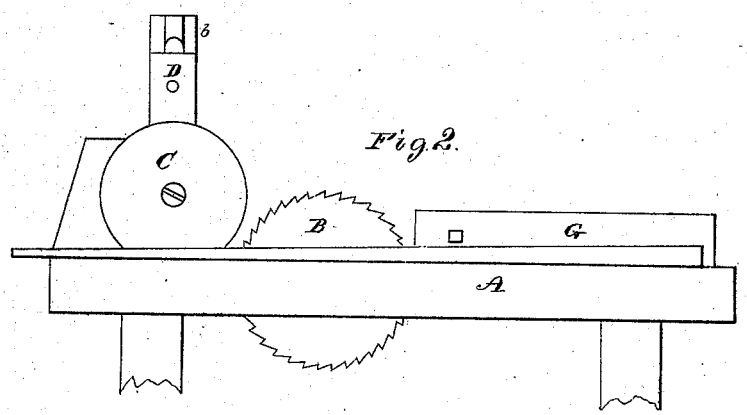
Witnesses.
Jam'l Foster
F. C. Hale
Amas Haseltine Jr
by his attorney
F. P. Hale

UNITED STATES PATENT OFFICE.

AMOS HASELTINE, JR., OF HAVERHILL, MASSACHUSETTS.

IMPROVEMENT IN SAWING-MACHINES.

Specification forming part of Letters Patent No. 129,952, dated July 30, 1872.

*To all whom it may concern:*

Be it known that I, AMOS HASELTINE, Jr., of Haverhill, in the county of Essex and State of Massachusetts, have invented an "Improvement in Sawing-Machines," for sawing boards, &c., of which the following is a specification:

The accompanying drawing exhibits a machine constructed in accordance with my improvement, and having a board thereon partially sawed.

Figure 1 denotes a side elevation, and Fig. 2 is a top view thereof.

My invention consists in the combination and arrangement of devices for guiding lumber to the saw, as hereinafter explained and claimed.

In the said drawing, A is a bed or table, having a circular saw, B, applied thereto, and extending up through a slot made through the table in the usual manner, the said saw being mounted upon a shaft, to which rotation may be imparted by means of a crank, or in any other suitable manner. C is a disk or wheel, which is affixed to one side of a vertical slider, D, the said wheel being so journaled thereto that its plane of revolution shall be coincident with that of the saw. This slider is so connected with its carrier or arm $b$ as to be capable of being moved vertically, and by means of a thumb-nut, $c$, affixed at any desirable position. The arm $b$ is supported by a horizontal arm, $e$, the outer end of which is secured to a standard, E, projecting up from the table, as shown in the drawing. The wheel C has a thickness a little greater than that of the saw or the kerf made thereby. Such wheel, having its edge beveled and running in the kerf made by the saw, serves to prevent the parts of the board in which the kerf has been made from closing together so as to bind the saw or stop its rotation. By means of the thumb-nut $c$ the wheel may be adjusted with respect to the thickness of the material being sawed.

In order to counteract the difficulty incident to those boards in which the parts spread laterally after being sawed, and, by their impingement against the gage, tend to bind the saw and deflect the unsawed part of the board out of its normal path, I make use of the following means: Instead of making the gage to extend nearly the whole length of the table, and to bear its entire length against the edge of the board, I make use of what may be called a short sectional gage, G, which only bears against that portion of the board which is before the saw and uncut. By this construction of the gage, should the parts of the board in which the kerf has been made spread laterally, they have free scope of movement, without any tendency to cramp the saw or deflect the board out of its true path. The gage G is affixed to a movable bar, H, whose two ends are pivoted to two parallel arms, $d\ d$, which are pivoted to the top of the table, as shown in the drawing. This bar, with the gage affixed thereto, is so connected with the table as to be capable of being freely moved laterally and adjusted in perfect parallelism with the plane of the saw and the anti-clamping disk C. The gage is also so applied to the bar H as to be capable of being adjusted or maintained at the same distance in front of the saw, whatever may be the width of the board to be sawed. The said gage may be fastened in position by means of clamp-nuts $f$. Furthermore, the gage G is so applied to the bar H as to be readily removed therefrom, in which case the said bar may be used as a gage for the board.

In operating with my improved machine, the saw having been put in rotation and the gage and the disk properly adjusted to the thickness and width of the board, the latter is to be laid flatwise upon the table, and, with one edge of the board resting freely against the gage, is next to be forced along against the cutting-edge of the saw and fed along until the desired length of kerf has been obtained, when the board, or parts thereof, may be removed from the table.

Having described my invention, what I claim is—

The adjustable gage G, the movable bar H, and its arms $d\ d$, pivoted to the table, as described, the whole being combined and arranged together so as to operate in manner as specified.

AMOS HASELTINE, JR.

Witnesses:
 F. P. HALE.
 F. C. HALE.